Oct. 6, 1959

T. S. BRISKIN ET AL 2,907,532

MOTION PICTURE PROJECTOR

Filed May 3, 1956

Oct. 6, 1959   T. S. BRISKIN ET AL   2,907,532
MOTION PICTURE PROJECTOR
Filed May 3, 1956   7 Sheets-Sheet 4

Inventors:
Theodore S. Briskin
Frank Lustig
Charles H. Taylor
By: Zabel, Baker, York,
Jones & Dithmar
Attorneys Oct. 6, 1959
T. S. BRISKIN ET AL
2,907,532
MOTION PICTURE PROJECTOR
Filed May 3, 1956
7 Sheets-Sheet 5
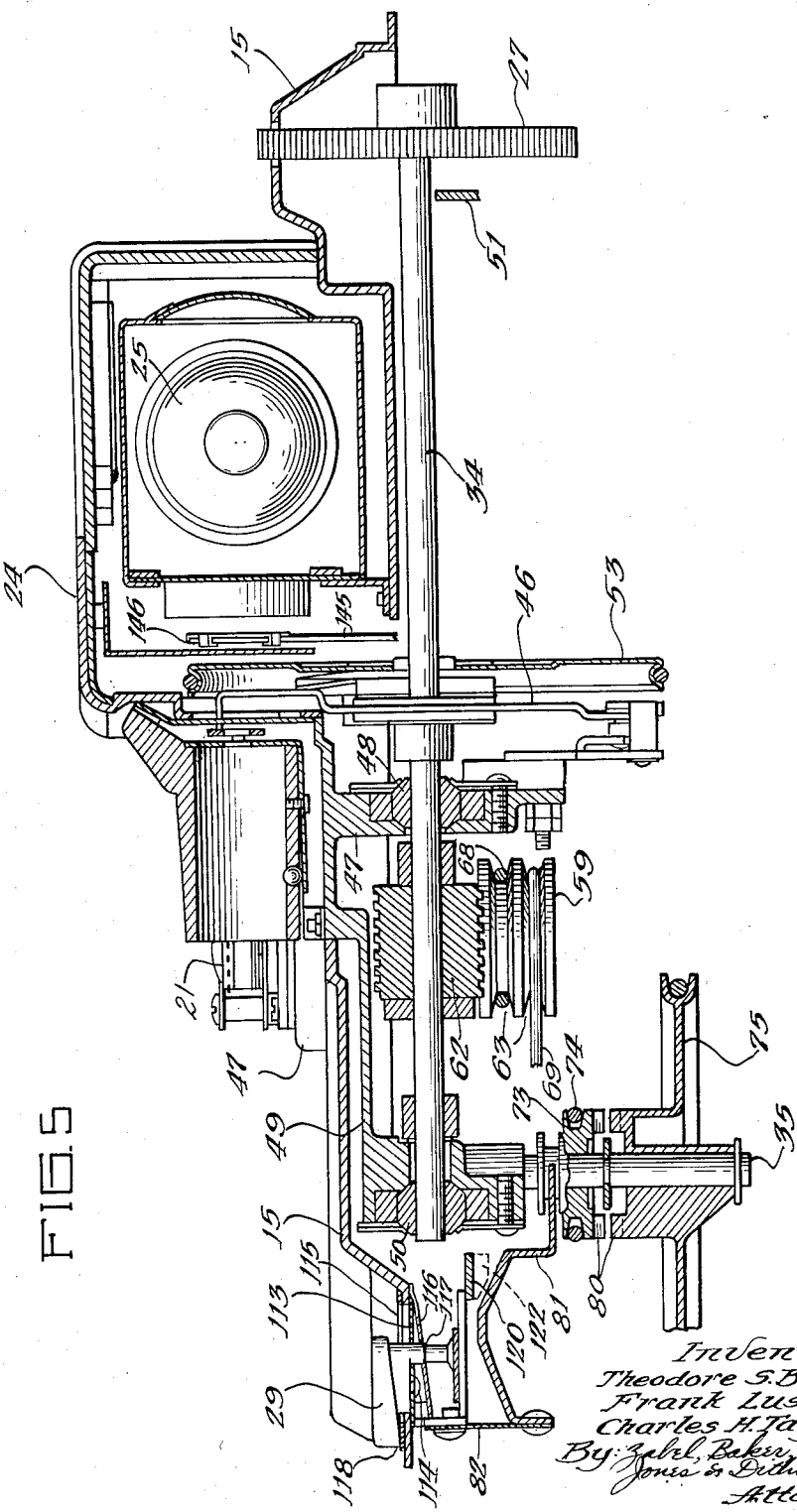

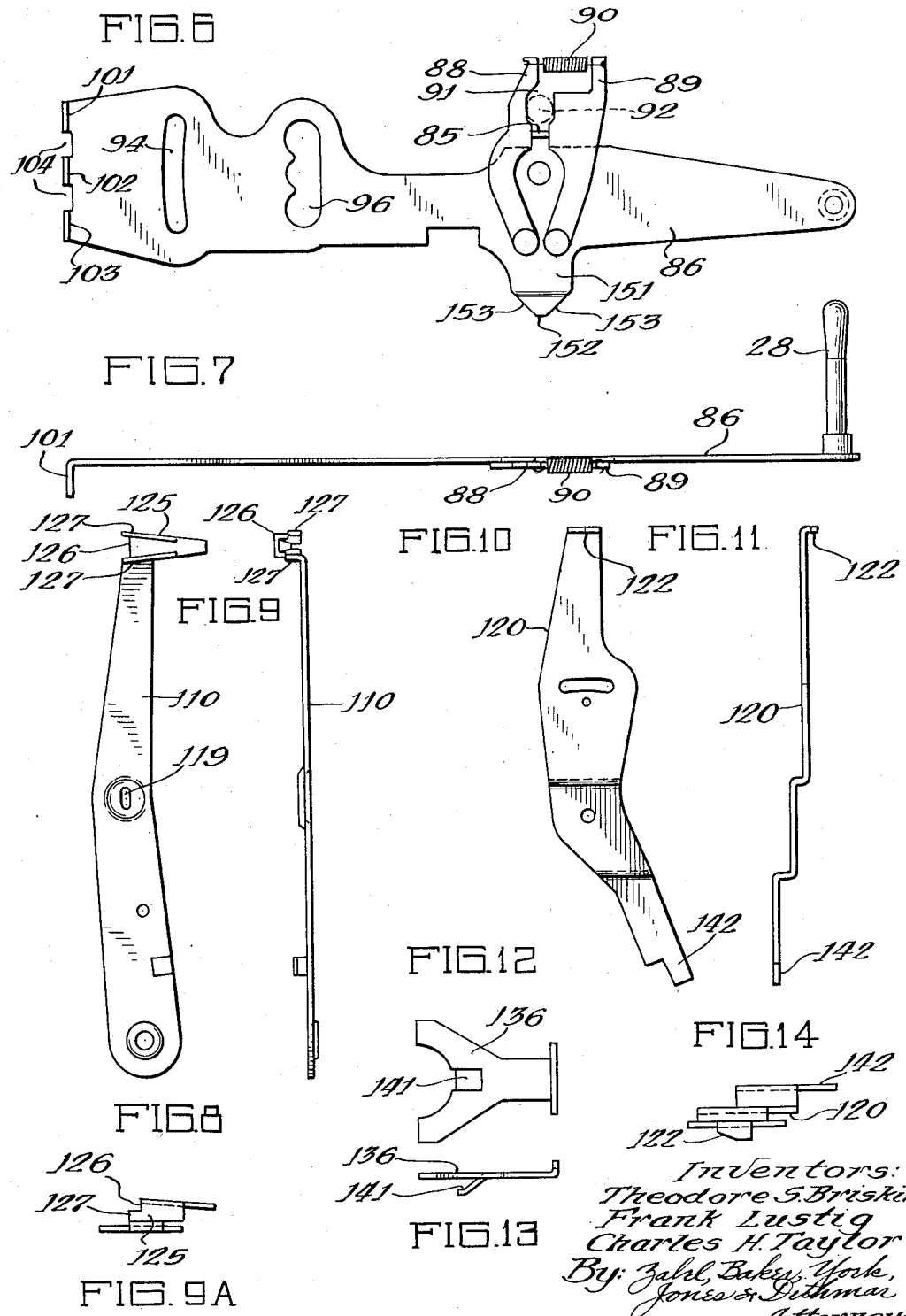

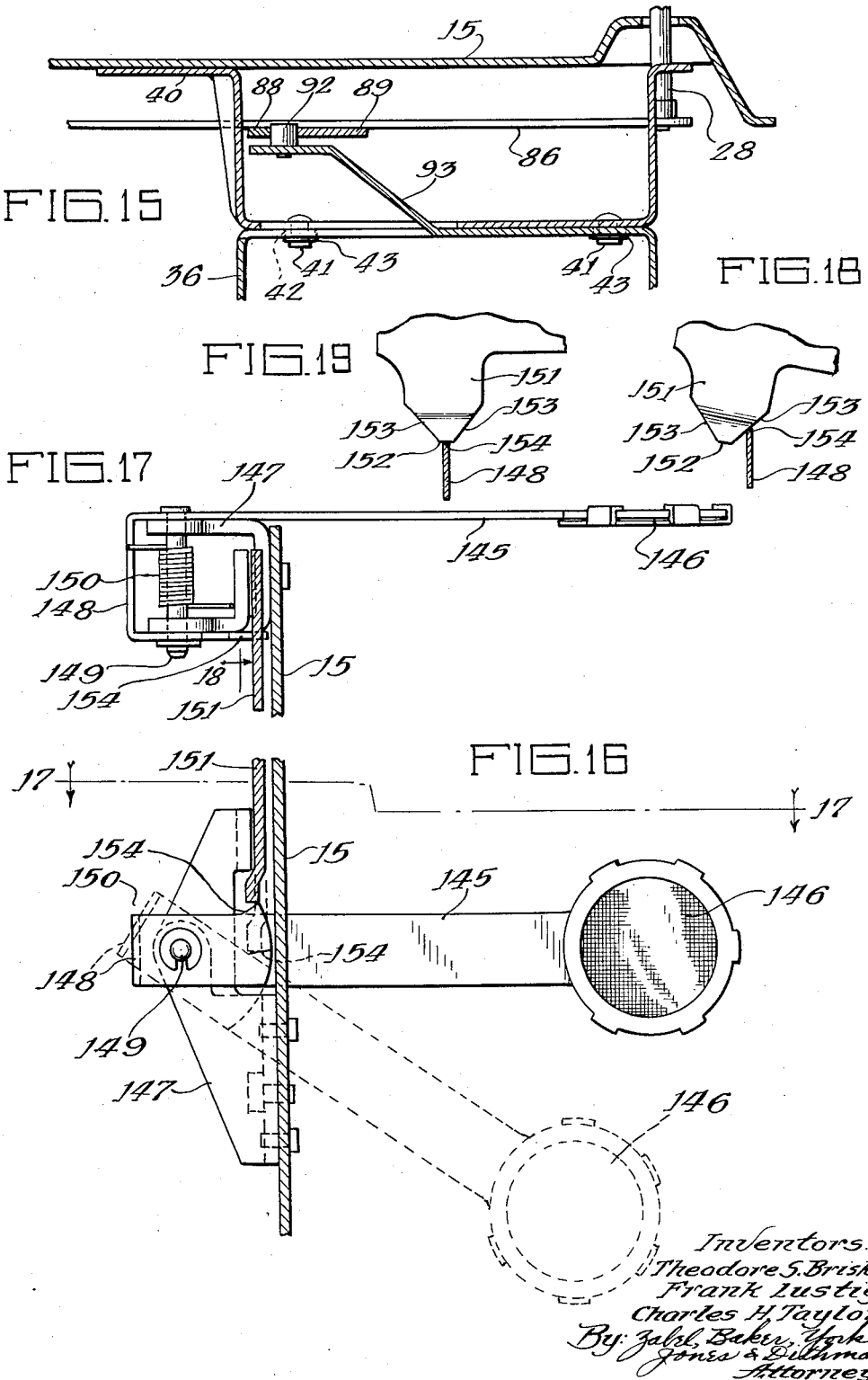

United States Patent Office 2,907,532
Patented Oct. 6, 1959

2,907,532

MOTION PICTURE PROJECTOR

Theodore S. Briskin, Chicago, Frank Lustig, Highland Park, and Charles H. Taylor, Chicago, Ill., assignors to Revere Camera Company, Chicago, Ill., a corporation of Delaware Application May 3, 1956, Serial No. 582,353

12 Claims. (Cl. 242—55.12)

This invention relates to improvements in motion picture projectors.

It is an object of this invention to provide a projector which embodies mechanism for forward projection, reverse projection, still projection, and rapid rewind. In this connection, the present invention provides two separate film drives, one being the projection drive, and the other being the rewind drive. The projection drive embodies means for driving the reels, the sprockets, and the claw, whereas the rewind drive embodies means for driving only the reels. By the use of a separate rewind drive it is possible to provide a higher speed ratio for rewinding than for projection.

Another object is to provide, in connection with still projection improved mechanism for operation of the fire screen.

Still another object in connection with reverse projection, is to provide improved mechanism for reversing the projection drive.

Still another object in connection with the rapid rewind is to provide improved rewind drive mechanism whereby rewinding is effected at a comparatively high rate of speed, and which mechanism is selective in its action, which is to say that the reverse rotation is applied only to the spindles or reels and not to the film sprockets and claw.

Still another object is to provide, in a device of the type described, improved interlocking means which prevents simultaneous operation of both the projection drive and the rewind drive, together with suitable control means.

Other objects, features and advantages will become apparent as the description proceeds.

With reference now to the drawings in whcih like reference numerals represent like parts:

Fig. 5 is a horizontal section taken along line 5—5 of Fig. 4;

Fig. 6 is a detailed side elevation of the projection drive control lever;

Fig. 7 is a top plan view of Fig. 6;

Fig. 8 is a detailed side elevation of the rewind control lever;

Fig. 9 is a left edge view of Fig. 8;

Fig. 9a is a top plan view of Fig. 8;

Fig. 10 is a detailed side elevation of the rewind actuating lever;

Fig. 11 is a left edge view of Fig. 10;

Fig. 12 is a detailed side elevation of the yoke for the control clutch;

Fig. 13 is a bottom plan view of Fig. 12;

Fig. 14 is a top plan view of Fig. 10;

Fig. 15 is a horizontal section taken along line 15—15 of Fig. 4;

Fig. 16 is a vertical section taken along line 16—16 of Fig. 4, showing the fire screen and the actuating cam therefor;

Fig. 17 is a plan view of Fig. 16, taken along line 17—17 of Fig. 16;

Fig. 18 is a detailed vertical section taken along line 18 of Fig. 17 showing the actuating cam, and Fig. 19 is a view similar to that of Fig. 18, but showing the parts in a changed position.

Figure 1:
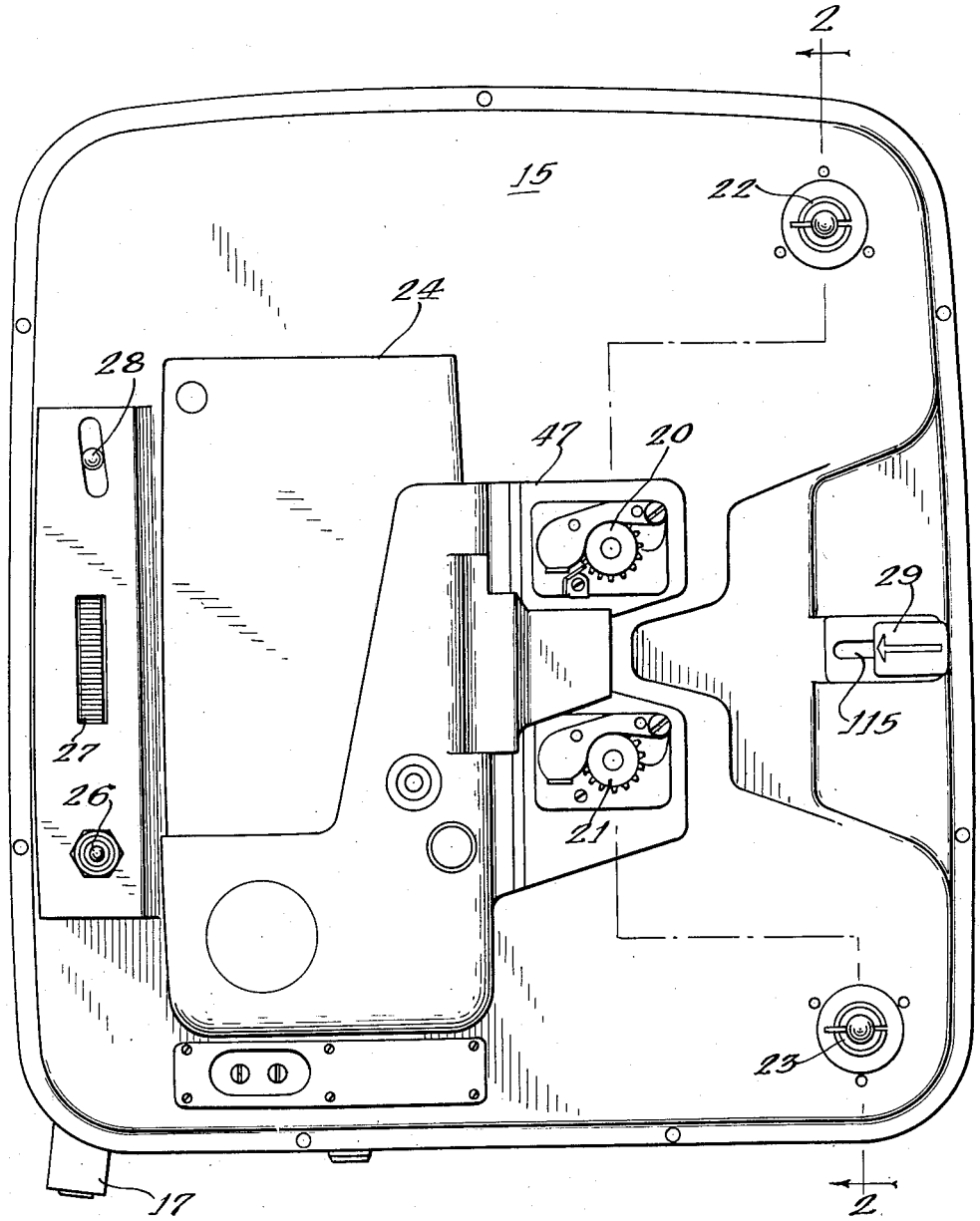
Fig. 1 is a side elevation of a motion picture projector comprising a preferred embodiment of our invention.
Figure 3:
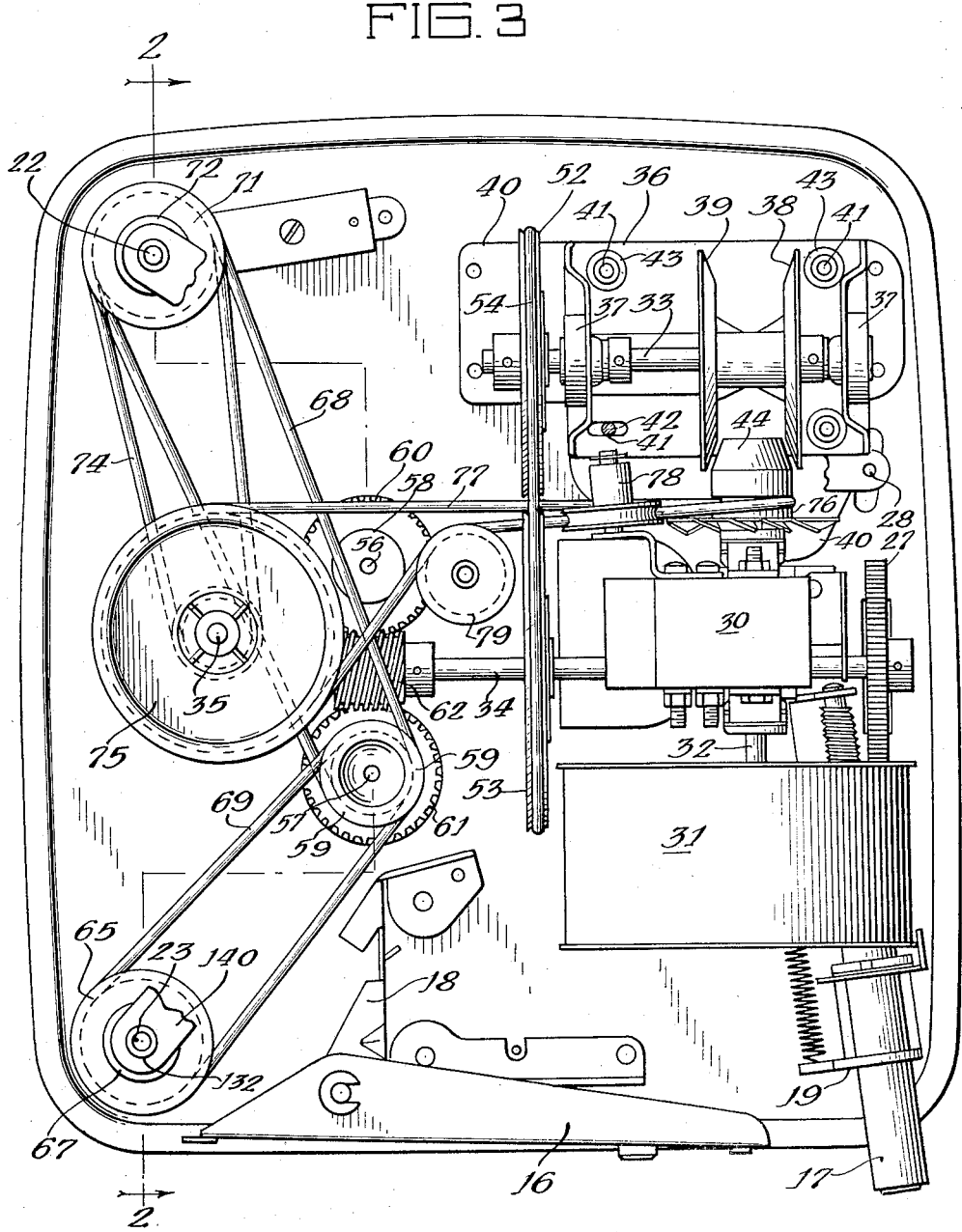
Fig. 3 is an elevation of the side opposite that shown in Fig. 1, certain of the underlying parts being omitted for purposes of clarity.
Figure 4:
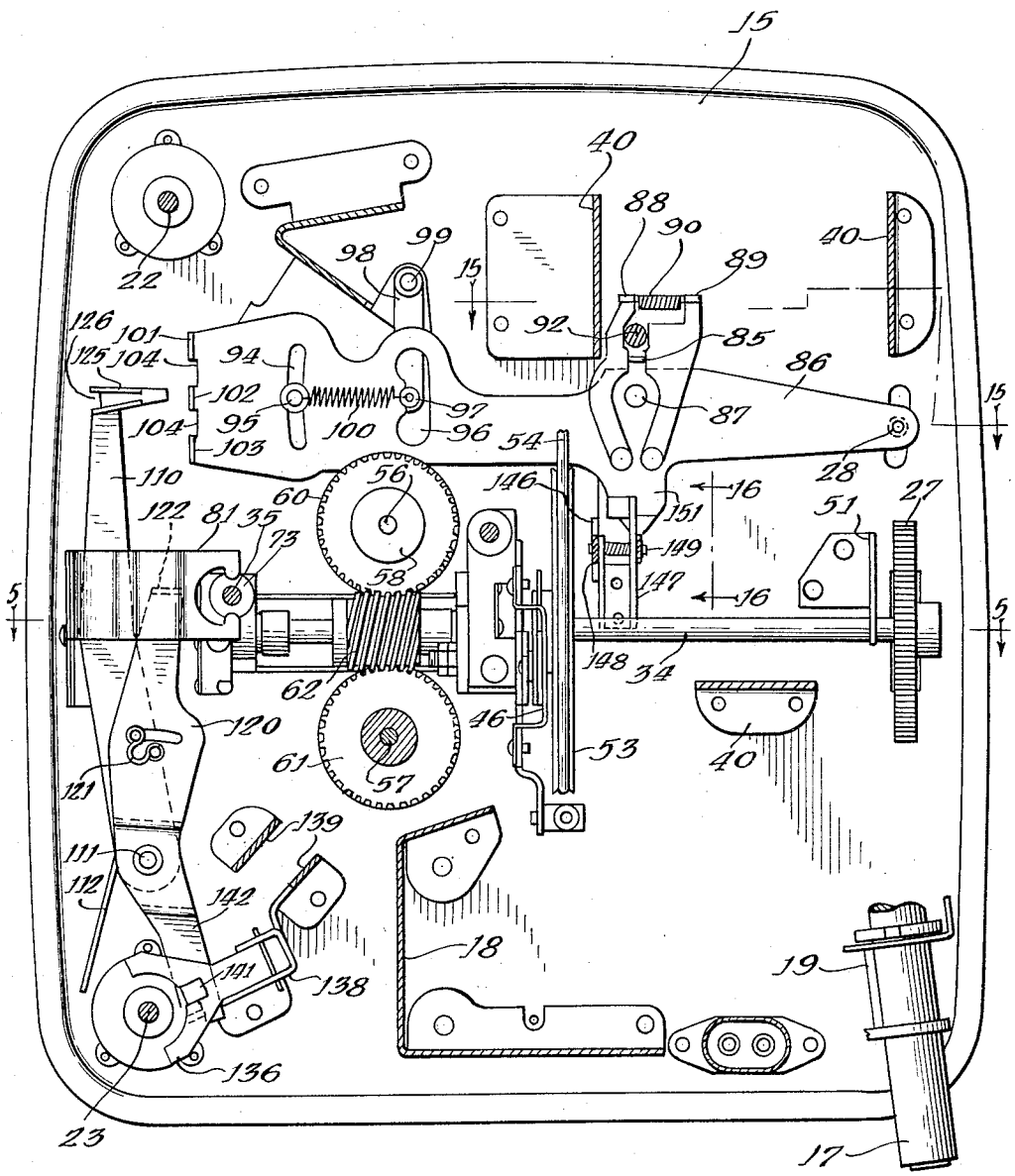
Fig. 4 is a sectional elevation similar to Fig. 3, but taken along line 4—4 of Fig. 2, showing the underlying parts omitted in Fig. 3.

The various parts of the projector are mounted on a structural wall plate 15, the two sides thereof being referred to as the exposed side shown in Fig. 1 and the enclosed side shown in Figs. 3 and 4. The drive mechanism is mounted on the enclosed side, and is enclosed by suitable casing, not shown herein, the casing being secured to the marginal portions of the wall plate 15. The projector is supported by a hinged front leg 16 and a slidingly mounted leg 17 suitably mounted on brackets 18 and 19, respectively, as shown in Figs. 3 and 4.

On the exposed side of the wall plate 15 are mounted upper and lower sprockets 20 and 21, respectively, supply and take-up spindles 22 and 23, respectively, a lamp housing 24 which encloses a lamp 25, a motor and lamp switch 26, a shutter wheel 27, a projection drive control knob 28, and a rewind control slide button 29.

On the enclosed side of the wall plate 15 are mounted a motor 30 and a blower housing 31, together with the projection drive mechanism, the rewind drive mechanism and various other parts which will be hereinafter described.

Projection drive mechanism

The projection drive mechanism includes a vertically disposed motor shaft 32 and two longitudinally disposed shafts, a shaft 33 and a drive shaft 34 which are driven from the motor shaft. The rewind drive includes a cross shaft 35 which is also driven from the motor shaft 32.

The countershaft 33 is mounted in a shiftable yoke 36 by means of suitable bearings 37, as shown in Fig. 3. Secured to the countershaft and rotating therewith are spaced disks 38 and 39, referred to herein as the forward and reverse disks, respectively. The yoke 36 is slidably mounted on a bracket 40 which is secured to the wall plate 15 as shown in Fig. 4. The yoke 36 is secured to bracket 40 by means of rivets 41 which project outwardly from the bracket 40 through slots 42 formed in the yoke 36, and the parts are secured in place by a suitable spring washer and retaining clip assemblies 43, as shown in Fig. 3.

The motor 30 is a unidirectional motor, and secured to the upper end of the motor shaft 32 is a cone 44 made of suitable resilient material, such as rubber or neoprene, which cooperates with one or the other of the disks 38 or 39 to drive the shafts 33 and 34 in the forward or reverse direction, respectively, depending upon the position of the yoke 36. As shown in Fig. 3, the yoke 36 is in a neutral position in which the parts are not in driving relationship.

Figure 2:
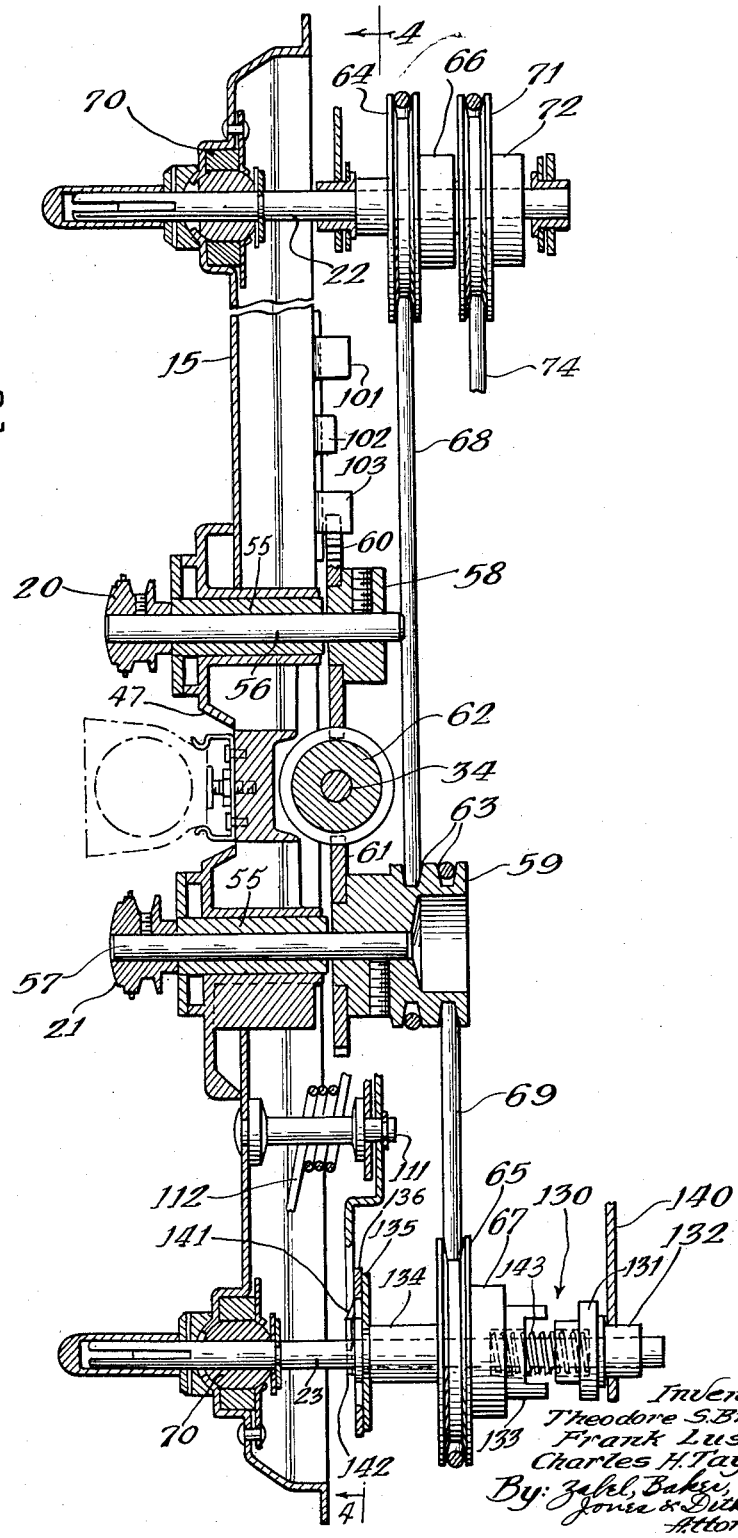
Fig. 2 is a vertical front section taken along line 2—2 of Figs. 1 and 3.

As shown in Figs. 2 and 5, an opening is provided in the wall plate 15, and a sprocket support 47, in the form of a casting, is located in this opening. The sprocket support 47 also includes a forwardly extending arm 49, shown in Fig. 5. The drive shaft 34 is journaled in two bearings 48 and 50, the former being mounted in the sprocket support 47 and the latter in the arm 49. At the rear end of the drive shaft 34, there is a guide member 51 which is normally spaced from the drive shaft 34 by a slight clearance, but which serves to prevent undue flexure of the shaft 34 incident to manual operation of the shutter wheel 27, which is secured to the shaft.

The drive shaft 34 is driven from the countershaft 33 by means of pulleys 52 and 53 and a cooperating belt 54. The pulley 53 which is secured to the drive shaft 34, comprises a shutter wheel, and also serves to drive claw means 46 through suitable eccentric mechanism, not described herein. The web of the pulley or shutter wheel 53 is provided with suitable apertures in order that the desired shutter effect may be achieved.

In operation, when the yoke 36 is shifted to the left, the drive shaft 34 and shutter wheel 53 are driven in the forward direction, due to the driving engagement between elements 38 and 44, and when shifted to the right, are driven to the reverse projection direction due to the driving engagement between elements 39 and 44.

As shown in Fig. 2, the sprocket support 47 is provided with separate bushings 55 in which are journaled the upper sprocket shaft 56 and the lower sprocket shaft 57. Secured to the upper sprocket shaft is a hub 58 and secured to the lower sprocket is a hub 59. Worm wheels 60 and 61, respectively, are secured to the hub members 58 and 59, and these mesh with and are driven by a worm 62 which is secured to the drive shaft 34, as shown in Figs. 2, 4 and 5. The lower hub 59 also constitutes a pulley, since it is provided with two sets of pulley grooves 63.

The pulley 59 drives the two spindles 22 and 23, mounted in suitable bearings 70 in the wall plate 15, through a selective driving connection provided by suitable one-way clutches 66 and 67, such as the usual ball type overrunning clutch. A reverse drive pulley 64 is rotatably mounted on the supply spindle 22 and driving engagement between the two in the clockwise direction as viewed in Fig. 3, is provided by the one-way clutch 66. Similarly, a forward drive pulley 65 is rotatably mounted on the take-up spindle 23, and suitable driving connection between the two in the counter-clockwise direction is provided by the one-way clutch 67. Belts 68 and 69 connect pulleys 59—64, and 59—65, respectively.

In operation, therefore, it will be seen that when the drive shaft 34 is rotated in the forward drive direction, the take-up spindle 23 is driven in the counter-clockwise direction by the pulley 65. The pulley 64 at this time is also driven in the counterclockwise direction, but since in this direction, the clutch 66 is disengaged, the supply spindle 22 is not driven. In other words, the pulley 64 overruns the more slowly rotating supply spindle 22.

When the drive shaft 34 is rotated in the reverse drive direction, both pulleys (64, 65) are driven in the clockwise direction. However, due to the provision of clutches 66 and 67, only the supply spindle 22 is driven in the clockwise direction, since the clutch 67 is disengaged. To summarize, during forward drive, the take-up spindle 23 is positively driven in the counterclockwise direction, and during reverse drive, the supply spindle 22 is positively driven in the clockwise direction, as viewed in Fig. 3.

*Rewind mechanism*

One of the objects of providing a separate rewind mechanism is to enable the supply spindle 22 to be driven at a greater rate of speed than in the case of the reverse projection drive. To this end, a second pulley 71 is rotatably mounted on the supply spindle 22 and is associated therewith by a second one-way clutch 72 (Fig. 2). This pulley 71 is driven from a drive pulley 73 which is rotatably mounted on the cross shaft 35 (Figs. 3 and 5), the latter being preferably a non-rotating shaft. Belt 74 connects pulleys 71 and 73.

Also rotatably mounted on the cross shaft 35 is a large pulley 75 which is driven from a pulley 76 mounted on motor shaft 32 by means of a belt 77, as shown in Figs. 3 and 5. Suitable idler pulleys 78 and 79 are disposed between the pulleys 75 and 76 in order to define the belt path and the 90° twist therein. In operation, the large pulley 75 is continuously driven from the motor shaft 32, irrespective of whether the drive shaft 34 is being driven or not.

Since the motor 30 is a comparatively high speed motor, the drive between the motor shaft and the pulley 59 involves considerable speed reduction, as is evidenced by the use of the worm drive 61—62. On the other hand, the belt drive between the motor shaft 32 and the drive pulley 73 embodies a speed reduction of lesser extent with the result that the second, or rewind pulley 71 is normally driven at a much greater rate of speed than is the pulley 64.

The driving connection between the large pulley 75 and the drive pulley 73 is established or broken by means of the clutch tooth members 80 which are formed on the respective pulleys, as shown in Fig. 5, in order that the rewind drive may be operative only when the projection drive is inoperative. The drive pulley 73 is provided with a groove which is engaged by a yoke 81, shown in Figs. 4 and 5, and the yoke is mounted on a leaf spring 82 suitably secured to the wall plate 15. The spring 82 urges the yoke to the left, as shown in Fig. 5, with the result that the clutch members 80 are biased into disengaged position. Means hereinafter described are provided to actuate the yoke member for causing engagement of the clutch 80.

*Projection drive control*

A control lever 86 is pivotally mounted at 87 on the enclosed side of the wall plate 15 for shifting the yoke 36 into either the forward drive, neutral, or reverse drive positions. The control knob 28 is mounted at the rear end of the control lever 86 and projects through the wall plate 15 where it is accessible to the operator. As shown in Figs. 6 and 7, two arms, 88 and 89 are pivotally mounted on the control lever 86, and are urged toward each other by a spring 90, the limiting position of each arm being determined by a suitable stop 85. The arrangement is such that an opening 91 is provided between the arms 88 and 89 which is adapted to receive a lug 92 formed on a tongue 93. The tongue forms a part of the yoke 36, and projects through a suitable slot formed in the bracket 40, the relationship of the parts being shown in Fig. 15. Thus, when the control lever 86 is rotated in the counterclockwise direction, the yoke 36 will be shifted to the left, as shown in Fig. 3, so that the forward drive disk 38 is engaged by the cone 44, and vice-versa. The arm and spring arrangement 88—90, causes the disks to be urged into yielding engagement with the cone 44 by the reslience of the spring 90. Additionally, it permits an overthrow of the control lever 86 beyond the limiting positions of the yoke 36, and this overthrow is utilized for operating the fire screen, as will be pointed out hereinafter.

The forward end of the control lever 86 is provided with a guide slot 94, as shown in Figs. 4 and 6, through which extends a guide pin 95, mounted in the wall plate 15. Rearwardly of the guide slot is a locating slot 96 providing three notches, corresponding to forward drive, neutral, and reverse drive positions. A locating pin 97 mounted on arm 98 pivoted at 99 is urged forwardly by spring 100 which extends between pins 95 and 97. Thus, the cooperation of the locating pin 97 with the notches of the locating slot 96 serves to maintain the control lever 86 in one of the three positions provided. The spring 100 is stronger than the spring 90 so that the lever 86 will tend to be rocked into its full home position, against the bias of the spring 90.

The forward edge of the control lever 86 is turned up to provide three separate elements, a forward block 101, a neutral detent 102, and a reverse block 103. As viewed in Fig. 2, the neutral detent 102 is considerably shorter than the blocks 101 and 103. These elements are separated by gaps 104. The elements 101 to 103 cooperate with the rewind control mechanism to provide an interlock between the two separate drives.

Rewind control mechanism

A control lever 110 is pivoted at 111 on the enclosed side of the plate 15. A spring 112 urges the same rearwardly, that is, in a clockwise direction as viewed in Fig. 4.

The rewind slide button 29 is disposed adjacent the control lever 110 and is slidably mounted in a slot 115 in the wall plate 15. The button 29 is retained in position by a retaining plate 113 which is associated with the button 29 by a pin 114 which extends through the slot 115 (Fig. 5). A slotted spring guide 116 bears against a shoulder 117 formed on the pin 114 so as to urge the rear portion of the button 29 away from the plate 15. The bottom surface of the button 29 is cut on the bias so that the forward corner edge provides a fulcrum point 118. The reduced end of the pin 114 is received in a suitable aperture 119 in the control lever 110. Fig. 5 shows the button 29 in its forward, or inoperative position. As it is moved rearwardly, the pin 114 causes the control lever 110 to be rocked rearwardly until a shoulder portion 126 interlocks with the neutral detent 102. The parts are returned from the operative to the inoperative position by depressing the rear edge of the button 29 against the bias of the spring guide 116, and this disengages the shoulder 126 from the neutral detent 102, as will be hereinafter described, thus permitting the spring 112 to return the control lever 110 to its inoperative position.

Movement of the control lever 110 causes operation of an actuating lever 120 which is also pivoted at 111, as shown in Fig. 4. The levers 110 and 120 are connected by an over-center spring 121, by means of suitable pins, so that when the button 29 and control lever 110 are moved rearwardly, that is to the right as shown in Fig. 4, the upper end of the actuating lever 120 will move forwardly, and vice-versa. Said upper end is provided with a cam edge 122 which engages the yoke 81 for displacing the latter against the bias of spring 82, thus causing engagement of clutch 80 for establishing the rewind drive.

The upper end of control lever 110 is shaped to provide a wedge 125, as shown in Figs. 8, 9 and 9a. This wedge 125 cooperates with the elements 101—103 to provide an interlock which prevents operation of the rewind control lever 110, and button 29, when the projection drive control lever 86 is in either forward or reverse position. In other words, in either one of said positions, either the forward block 101 or the reverse block 103, will be abutted by the point of the wedge member 125 to block operation of the rewind control lever 110.

When the projection drive control lever 86 is in its neutral position, however, the wedges will pass beyond the neutral detent 102, and the shoulder 126 will interlock with the detent. The action of the spring 112, in addition to biasing the control lever forwardly, also biases the control lever toward the wall plate 15 to the end that the parts 125 and 102 are maintained in engagement. Rotation of the slide button 29 about its fulcrum point 118 will disengage the parts 125 and 102, as previously pointed out.

The wedge member 125 also cooperates with the elements 102—103 to provide an escapement action whereby the projection drive lever may be moved into either drive position even though the rewind control lever is locked in its operative position, the escapement action serving to release the wedge member 125 from the neutral detent 102. In this connection, the upper and lower surfaces of the wedge member 125 are extended forwardly beyond the shoulder 126 as shown in Figs. 8 and 9a, to provide trailing surfaces 127 which are engaged by the lower edge of the forward block 101, or the upper edge of the reverse block 103, as the case may be, when the projection drive control lever 86 is moved out of its neutral position. The gaps 104 are of a width greater than the corresponding dimension of the wedge member 125.

Assuming that the rewind control lever 110 is in its operated position, which necessarily implies neutral position for the projection drive control member, the shoulder 126 will interlock with the neutral detent 102. As the control lever 86 is moved into its forward position, the upper trailing surface 127 will engage the forward block 101 to prevent completion of the movement of the control lever 86 until such time as the spring 112 moves the control lever 110 forwardly so that the wedge member 125 is completely clear of the forward block 101. Then the control lever 86 is free to complete its movement into the forward drive position. In actual operation, the escapement action is sufficiently rapid that no hesitation is observed by the operator as he raises the control knob 28 from neutral into forward drive position.

To summarize the operation of the rewind control mechanism, the slide button 29 and control lever 110 can be moved into rewind drive position only when the knob 28 and the control lever 86 are in the neutral position. The parts 29 and 110 can be returned to inoperative position in two ways. One way is to press the button toward the wall plate 15 to disengage the wedge 125 from the neutral detent 102. The other way is to move the projection drive control knob 28 out of neutral position.

Control clutch for take-up spindle

During rewind the supply spindle 22 will be driven from the drive pulley 73, at a comparatively high rate of speed, and the drive will be in the reverse drive direction which means that the pulley 71 will be driven in the clockwise direction, as viewed in Fig. 3. However, the film itself will drive the take-up spindle 23, in the clockwise direction, which means that the take-up spindle 23 will tend to drive the pulley 65 through clutch 67. This will cause slippage of the pulley 65 with respect to the belt 69, imposing an undue load on the motor. To avoid this, suitable means are provided to render inoperative the drive connection between the pulley 65 and the take-up spindle 23.

As shown in Fig. 2, this means may be in the form of a control clutch 130 which includes a driven member 131 secured to the spindle 23 and a driving member 133 secured to the output element of clutch 67. The end of the spindle 23 is journaled in outer bearing 132 located adjacent the driven member 131. According to this construction, the pulley 65 and the clutch 67 are slidably and rotatably mounted on the spindle 23 so that the control clutch 130 may be disengaged.

In this connection, the pulley 65 is provided with a hub 134 which extends toward the wall plate 15, and which is grooved so as to accommodate a rotatably mounted disk 135 by means of which the assembly 134, 65, 67 and 133 may be shifted to the right, as shown in Fig. 2, to engage the clutch 130.

This engagement is effected by a yoke 136, shown in Figs. 2 and 4 which is pivotally mounted on a bracket 138. In the construction shown the bracket 138 forms a part of a bracket 139, the arm 140 of which serves to support the outer end of the spindle 23.

The yoke 136 is provided with a cam lug 141 which is engaged by the tail 142 of the actuating lever 120, the parts being so arranged that when the actuating lever 120 is in its inoperative position, the cam lug 141 will urge the pulley assembly 65, including the driving member 133, into engaged position. When the actuating lever 120 is operated, it is withdrawn from the cam lug 141 with the result that the clutch is urged into disengaged position by a suitable spring 143.

Thus, the pulley 65 is automatically disengaged from the spindle 23 during the rewind operation. At other times, when the clutch 130 is engaged, the pulley 65 is operative to drive the spindle in the clockwise direction only, through clutch 67.

The fire screen

As shown in Figs. 16 and 17, a fire screen 146 is provided which is mounted at the end of an arm 145. The fire screen is formed of a suitable wire mesh, and is automatically interposed between the lamp 25 and the film whenever the projection drive control 28 is in neutral position. This permits a still picture to be projected without injury to the film.

The arm 145 projects through the wall plate 15 and is mounted on a bracket 147 secured to the enclosed side of the wall plate, as shown in Figs. 4 and 16. The arm 145 terminates in a U-shaped portion 148, and a pivot pin 149 passes through both elements 147 and 148. A spring 150 surrounds the pivot pin 149 and urges the arm 145 upwardly, away from the optical axis, and into dotted line position shown in Fig. 16.

As shown in Figs. 4 and 6, the control lever 86 is provided with a downwardly extending projection 151 which provides a flat 152 and two cam surfaces 153. These surfaces 152 and 153 engage a follower 154 which forms a part of the U-shaped end portion 148. Thus, when the control arm 86 is in neutral, position, the follower 154 is maintained downwardly in the dotted line position of Fig. 16 by the flat 152, so that the fire screen 146 will be displaced into the optical axis.

At other times, that is, during forward or reverse projection, the flat 152 is displaced to one side or the other with the result that the fire screen 146 is free to move upwardly under the bias of spring 150.

The flat 152 is of such length that the fire screen is not moved out of its operative position until after the yoke 36 has been shifted into a drive position. In other words, the fire screen moves on the overthrow of the control lever 86 beyond the limiting position of the yoke 36.

The full home position of the control lever 86, in either forward or reverse projection drive is determined by the cooperation of the locating pin 97 with the top or bottom notches of the locating slot 98 and represents a greater angular displacement of the control lever 86 than that required by the spacing of the disks 38 and 39. The discrepancy is represented by the overthrow referred to above and is accommodated by the provision of the yieldingly mounted arms 88 and 89.

By introducing the overthrow into the projection drive control system, it is possible to interpose the fire screen before the projection drive is disconnected and to delay removal until after the film is in motion. Thus, there is no possibility that the film will be burned as might otherwise be the case.

Operation

The operation of the mechanism has been described in detail in connection with the description of the various parts and sub-assemblies. To summarize the same, the principal control elements are the switch 26, the projection drive control knob 28, and the rewind slide button 29. To operate the projector, supply and take-up reels (not shown) are mounted on spindles 22, 23, and the film threaded around the sprockets and through the film gate. Then the switch 26 is closed, and the control knob 28 is moved from neutral position N upwardly into forward drive position F. This causes the sprockets 20, 21 and the claw means 46 to drive the film forwardly, that is, from the supply reel to the take-up reel.

The take up is accomplished by driving the take-up spindle 23 through a slippage connection comprising pulleys 59, 65, and resilient belt 69. Although spindle 23 tends to be driven at a speed slightly greater than that corresponding to the minimum reel diameter, the rotational speed is limited by the linear speed of the film. This discrepancy is taken up by the slippage of the resilient belt 69 which may be in the form of a coil spring.

The selective driving connection provided by the one-way clutches 66, 67 permits the supply spindle 22 to idle, whereas during reverse projection drive spindle 22 is driven and the take-up spindle 23 idles.

The control knob 28 is moved downwardly to the R position for reverse projection drive. This shifts the yoke 36 so that cone 44 engages the reverse disk 39, with the result that the direction of rotation of sprockets 20, 21 and pulleys 64, 65 is reversed.

For still projection, or single frame projection, the control knob 28 is moved into its neutral position N. This disconnects the film drive. The shutter wheel 27 may be rotated to permit adjustment of the shutter wheel 53 to clear the light beam. The fire screen 146 automatically drops between the film and the lamp 25 as the knob 28 is moved. The timing is such that the fire screen 146 is interposed prior to the break of the driving engagement between the elements 44 and 39 or 38.

For rapid rewind, the control knob 28 is first shifted into neutral position. Then the slide button 29 is pushed rearwardly and is automatically locked in its operative position by the cooperation between the neutral detent 102 and the shoulder 126 on wedge 125. Operation of the slide button 29 causes engagement of the clutch 80 and disengagement of the control clutch 130. As a result, the supply spindle 22 is driven at a rapid rate of speed by the separate driving means 73—77 and through the one-way clutch 72, and at the same time, the take-up spindle 23 which now idles, is rotated by the film tension. The rewind drive is disconnected either by returning the slide button 29 to its inoperative position, or by moving the control knob 28 into its forward drive position, as previously indicated.

During forward drive projection, the supply spindle 22 is driven in the counterclockwise direction by the film, which means that the rewind clutch 72 is engaged, and that the pulley 71 will be driven. However, at this time, the rewind clutch 80 is disengaged with the result that the drive pulley 73 idles. In other words, the rewind clutch 80 takes the place of a separate control clutch which would otherwise be necessary to disconnect the output of clutch 72 from the supply spindle 22 during forward projection drive, if the drag due to belt slippage is not desired. Thus, the clutches 80 and 130 provide for non-conflicting operation of the two independent drive mechanisms, the projection drive, and the rewind drive. Furthermore, the mechanism disclosed herein provides for both forward projection, reverse projection and still projection without in any way detracting from rapid, efficient and low torque rewind operation.

Although only a preferred embodiment of our invention is described and illustrated herein, it will be understood that various modifications and changes may be made in the construction shown without departing from the spirit of our invention as pointed out by the appended claims.

We claim:

1. A motion picture projector comprising a motor, a supply spindle, a take-up spindle, a drive shaft, means for providing a selective driving connection between said drive shaft and one or the other of said spindles, depending upon the direction of rotation of said drive shaft, reversing means disposed between said motor and said drive shaft, first control means movable into a reverse drive position, a neutral position, and a forward drive position for controlling the operation of said reversing means and for disconnecting said projection drive from said motor, a rewind drive for said supply spindle, a first clutch disposed between said connection providing means and said take-up spindle, a second clutch interposed between said rewind drive and said motor, and second control means for causing engagement of said second clutch and disengagement of said first clutch, and operative when said first control means is in a neutral position in order to operate said rewind drive, and interlocking means preventing operation of said rewind drive control means when said projection drive control means is in either forward or reverse position.

2. In a motion picture projector, a reversible projection drive comprising a motor shaft, a counter shaft disposed perpendicular thereto, a driving cone mounted at the end of said motor shaft, a pair of spaced disks secured to said countershaft and rotating therewith, a yoke in which said countershaft is mounted, means for shiftably mounting said yoke so that one or the other of said disks may be moved into driven engagement with said driving cone, a control lever movable between a forward drive position, a neutral position, and a reverse drive position, and means connecting said control lever and said shiftable yoke for actuating the latter, said yoke being maintained in a position wherein neither one of said disks engage said driving cone when said control lever is in neutral position to permit still projection, and a displaceable fire screen actuated by movement of said control lever into neutral position.

3. In a motion picture projector, reversing means for the projection drive thereof comprising a motor shaft, a counter shaft disposed perpendicular thereto, a driving cone mounted at the end of said motor shaft, a pair of spaced disks secured to said countershaft and rotating therewith, a yoke in which said countershaft is mounted, a structural plate, means for shiftably mounting said yoke on said structural plate so that one or the other of said disks may be moved into driven engagement with said driving cone, a control lever pivotally mounted on said structural plate, detent means for said control lever for causing the same to seek one of three positions, corresponding to a forward position, a neutral position, and a reverse position, and means connecting said control lever and said shiftable yoke for actuating the latter, said yoke being maintained in a position wherein neither one of said disks engage said driving cone when said control lever is in neutral position.

4. A motion picture projector as claimed in claim 3 including a fire screen pivotally mounted on said structural plate, a projection on said control lever including two cam surfaces and a flat, said flat being located between said cam surfaces, a follower on said fire screen and engaged by said projection, and means biasing said fire screen into inoperative position whereby movement of said control level from either forward or reverse position into neutral position will cause said flat to displace said follower against the action of said biasing means to displace said follower and said fire screen from inoperative into operative position.

5. Reversing means as claimed in claim 3 in which said means for connecting said control lever and said yoke comprises a pair of arms pivotally mounted on said control lever, spring means biasing said arms toward each other, and stop means for limiting the movement of said arms toward each other in order to provide a gap between said arms, a portion of said yoke being received in said gap, whereby said control lever may be overthrown beyond the limiting position of said yoke, as determined by the engagement of one of said disks with said driving cone, and whereby the resilience of said spring means provides a resilient engagement between said disk and said driving cone.

6. A motion picture projector as claimed in claim 5 including a fire screen pivotally mounted on said structural plate, a projection on said control lever including two cam surfaces and a flat, said flat being located between said cam surfaces, and a follower on said fire screen and engaged by said projection, and means biasing said fire screen into inoperative position whereby movement of said control lever from either forward or reverse position into neutral position will cause said flat to displace said follower against the action of said biasing means to displace said follower and said fire screen from inoperative into operative position, and said flat being of a length corresponding to the displacement of said shiftable yoke whereby the movement of said fire screen occurs only during the overthrow of said control lever beyond the limiting position of said yoke.

7. In a motion picture projector embodying a supply spindle and a take-up spindle, the combination of a reversible projection drive for selectively driving either said take-up spindle in the forward direction, or said supply spindle in the reverse direction, first control means for said projection drive and movable between a forward drive position, a neutral position, and a reverse drive position, a rewind drive for driving said supply spindle in the reverse direction, and second control means for actuating same, said first control means including a first control lever having a forward block, a neutral detent, and a reverse block thereon, and said second control means including a second control lever mounted for movement between an operative and an inoperative position, said forward and reverse blocks serving to block movement of said second control lever into operative position when said first control means is located in its forward drive or reverse drive positions respectively, said second control lever being free for such movement at other times.

8. A motion picture projector as claimed in claim 7 in which said first control lever is provided with a neutral detent located between said forward block and reverse block and in which said second control lever is provided with an end portion adapted to abut said forward and reverse blocks at the time indicated, and adapted to pass beyond said neutral detent when said first control means is located in its neutral position, and a shoulder on said end portion for engagement with said neutral detent.

9. A motion picture projector as claimed in claim 8 in which said forward block, said neutral detent and said reverse block are separated by gaps, and in which said end portion is provided with rearwardly trailing upper and lower surfaces which are extended beyond said shoulder for abutting engagement with said forward and reverse blocks, respectively, said upper and lower trailing surfaces being spaced from each other by a width less than said gaps, whereby an escapement action is provided when said first control lever is moved into either forward or reverse drive position at a time when said second control lever is engaged by said neutral detent for providing automatic disengagement between said first control lever and said second control lever.

10. A motion picture projector as claimed in claim 7 in which said first control lever is provided with a neutral detent located between said forward block and reverse block and in which said second control lever is provided with a shoulder for engagement with said neutral detent when said first control means is located in its neutral position, means biasing said shoulder into engagement with said neutral detent for maintaining said second control lever in its operative position, said second control means also including means for displacing said second control lever against the action of said biasing means so that said shoulder will become disengaged from said neutral detent, and means for urging said second control lever into its inoperative position when disengaged.

11. In a motion picture projector having a supply spindle and a take-up spindle, the combination of two pulleys mounted on said supply spindle, two one-way clutches, one disposed between each pulley and said spindle and both acting in the same direction, reversible projection drive means for driving one of said pulleys to provide reverse movement of said film for reverse projection, separate rewind drive means for driving the other one of said pulleys in the same direction but at a greater speed, a third pulley which is mounted on said take-up spindle and driven by said reversible projection drive means, a third one-way clutch disposed between said third pulley and said take-up spindle and acting in the opposite direction from that of said first-mentioned one-way clutches to provide a driving connection between said third pulley and take-up spindle for forward movement of said film for forward projection, and means for rendering inoperative said driving connection when said separate rewind means is operative.

12. A motion picture projector as claimed in claim 11 in which said means for rendering inoperative said drive connection comprises a control clutch disposed between said third one-way clutch and said take-up spindle.

References Cited in the file of this patent

UNITED STATES PATENTS

| | | |
|---|---|---|
| 1,802,045 | Bogopolsky | Apr. 21, 1931 |
| 1,920,967 | Carpenter | Aug. 8, 1933 |
| 2,196,738 | Nagel | Apr. 9, 1940 |
| 2,236,380 | Rausch | Mar. 25, 1941 |
| 2,313,662 | Morgan et al. | Mar. 9, 1943 |
| 2,343,850 | Fairbanks et al. | Mar. 7, 1944 |
| 2,604,271 | Moomaw | July 22, 1952 |
| 2,666,594 | Jungjohann | Jan. 19, 1954 |
| 2,716,005 | Askren et al. | Aug. 23, 1955 |